United States Patent [19]

Hirshberg

[11] 4,413,854
[45] Nov. 8, 1983

[54] DUAL DECK CONSTRUCTION FOR A HATCHBACK TYPE AUTOMOBILE

[75] Inventor: Gerald P. Hirshberg, Del Mar, Calif.

[73] Assignee: Nissan Design International, Inc., La Jolla, Calif.

[21] Appl. No.: 312,548

[22] Filed: Oct. 19, 1981

[51] Int. Cl.³ .............................................. B60J 5/10
[52] U.S. Cl. ..................................... 296/146; 296/76; 296/37.16
[58] Field of Search ................ 296/76, 56, 37.16, 106; 49/163, 169, 170

[56] References Cited

U.S. PATENT DOCUMENTS

| 2,647,788 | 8/1953 | Kaiser et al. | 296/76 |
| 2,936,195 | 5/1960 | Schutte | 296/106 |
| 3,612,601 | 10/1971 | Himka et al. | 49/163 |
| 3,713,472 | 1/1973 | Dozois | 296/56 |

Primary Examiner—Robert R. Song
Assistant Examiner—Dennis Pedder
Attorney, Agent, or Firm—Fulwider, Patton, Rieber, Lee & Utecht

[57] ABSTRACT

A dual deck construction for the trunk of a hatchback type automobile. The trunk opening is covered by a hinged two piece liftgate. The rear portion of the liftgate can be opened independently of the front portion to give access to the rear deck portion of the trunk. Alternatively, the entire liftgate can be opened to expose the entire trunk deck.

15 Claims, 14 Drawing Figures

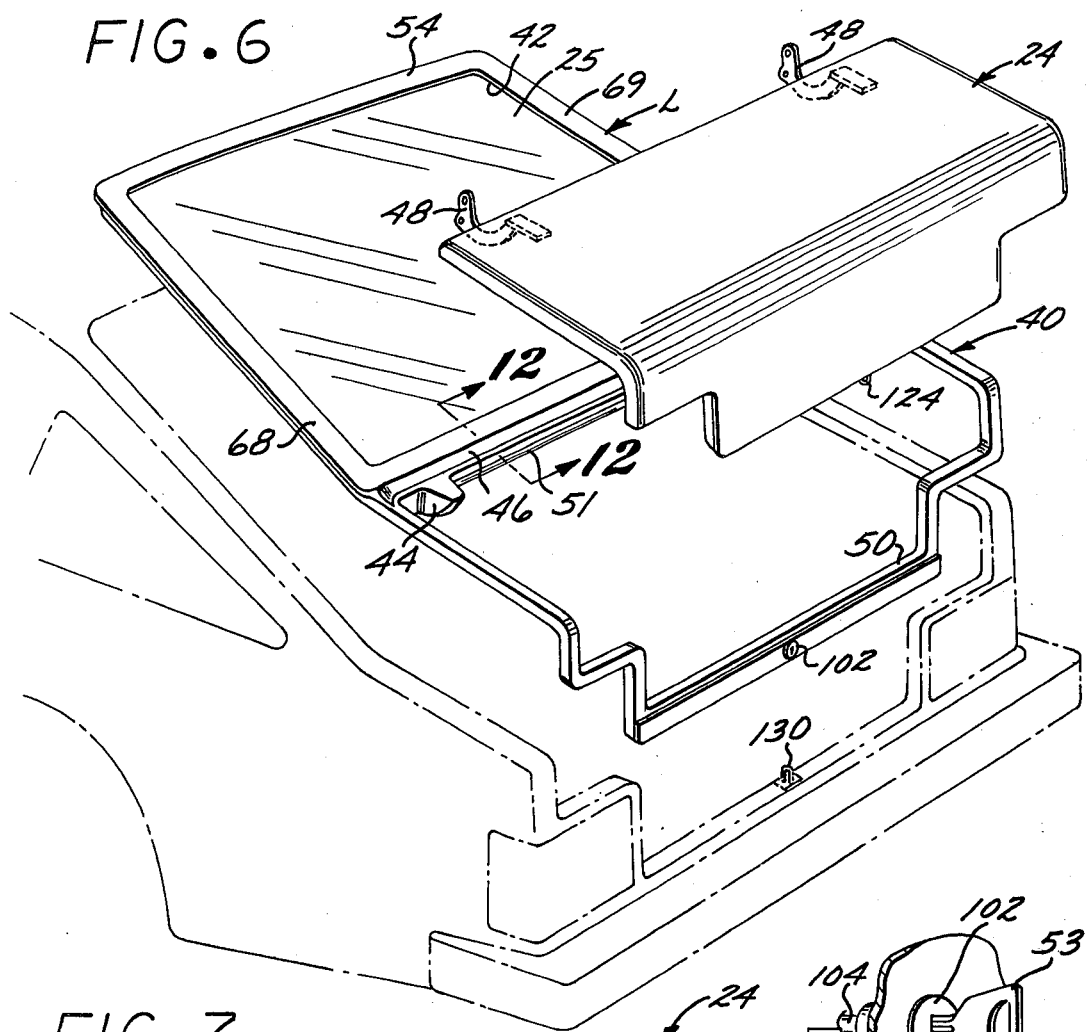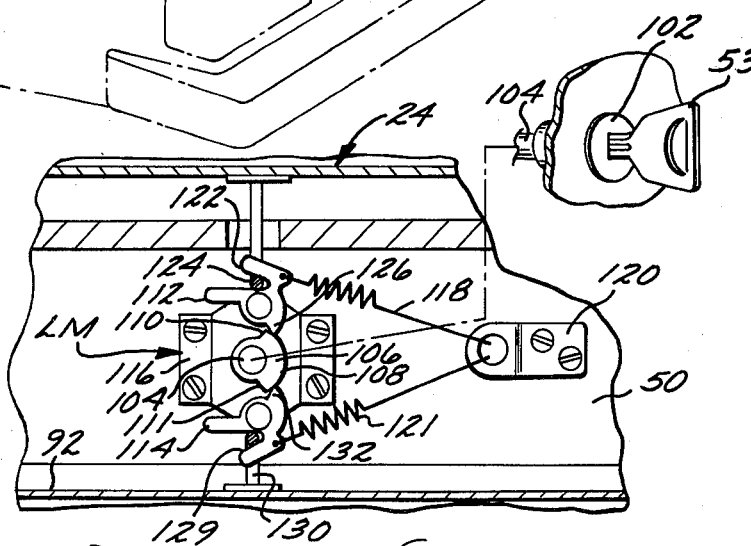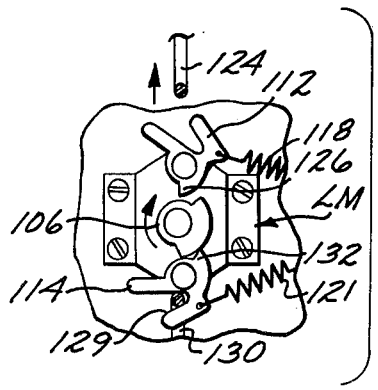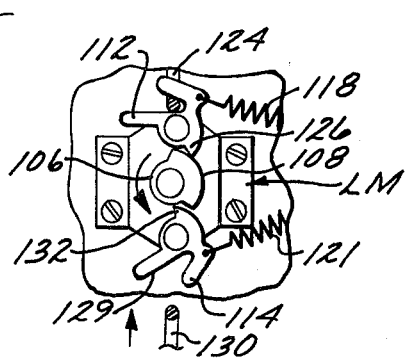

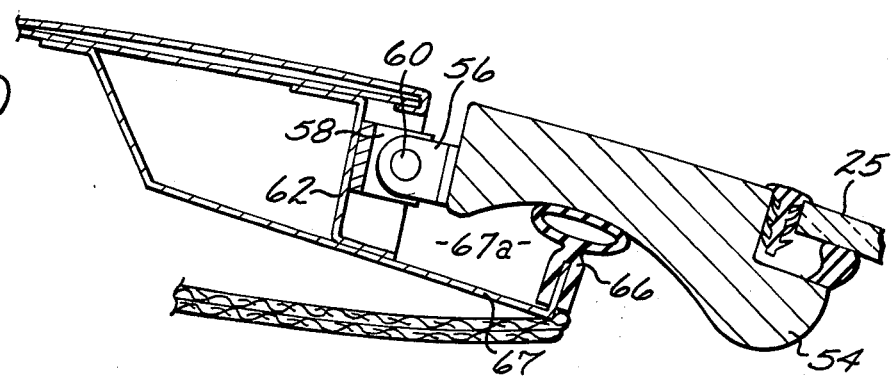
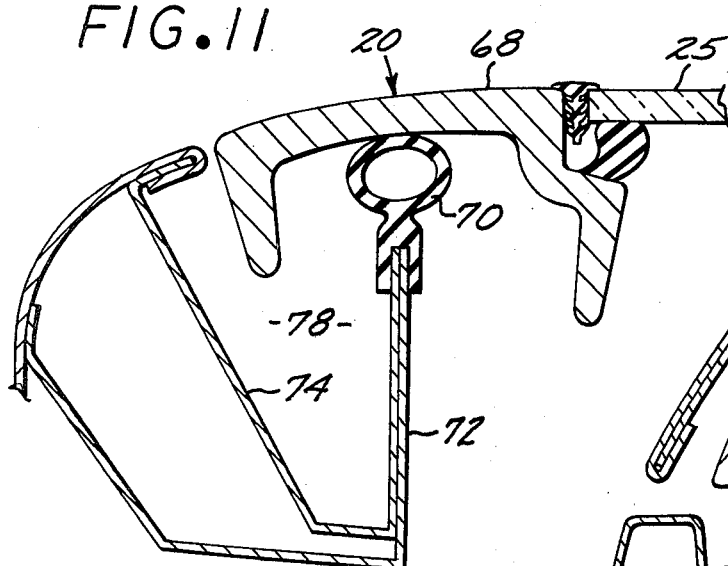
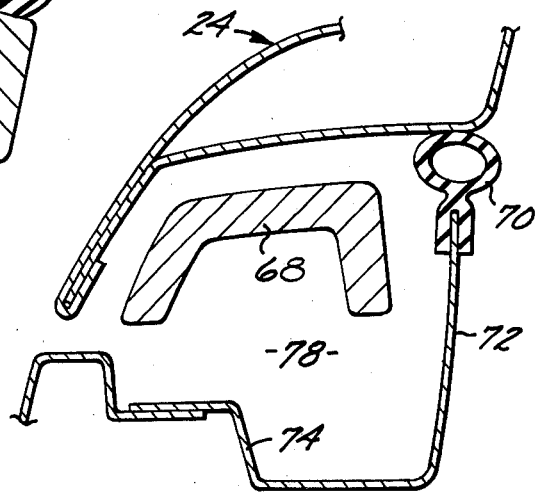
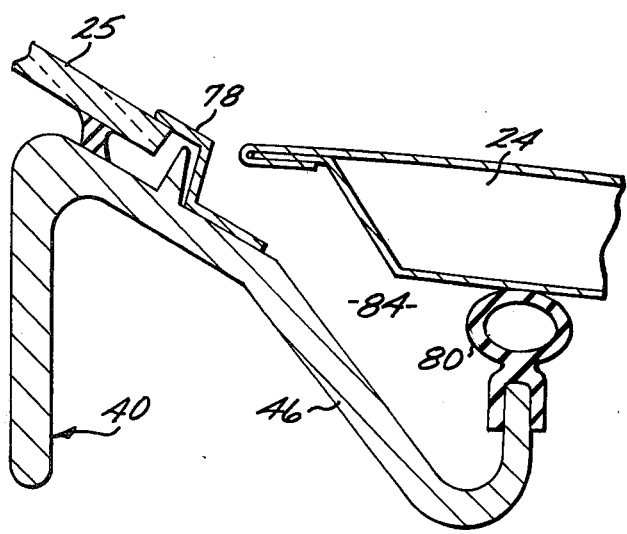
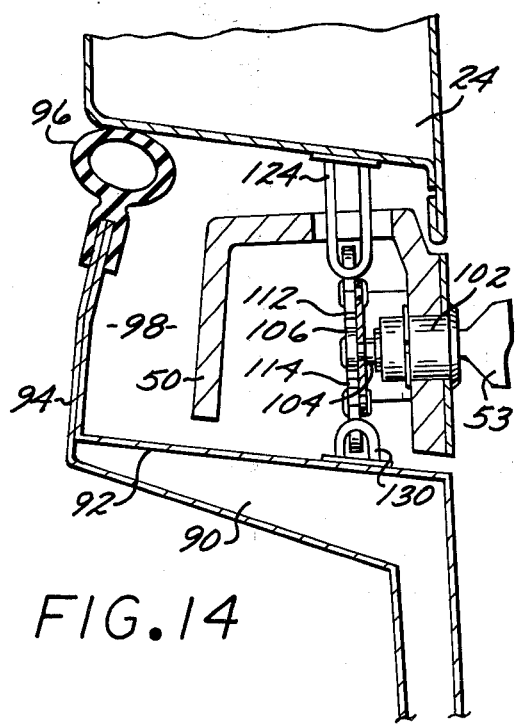

DUAL DECK CONSTRUCTION FOR A HATCHBACK TYPE AUTOMOBILE

DESCRIPTION OF THE PRIOR ART

Hatchback type automobiles have become extremely popular with automobile owners throughout the world. Such vehicles utilize a comparatively long trunk that is covered by a liftgate which is hinged at its front edge of the top portion of the automobile. Generally, the rear seats of the automobile fold forwardly to define a long, flat, large capacity trunk deck. It is a serious disadvantage of such hatchback construction that the comparatively heavy liftgate must be raised to provide access to the trunk even where only a small load is to be deposited therein e.g. groceries, small boxes and packages, umbrellas, extra clothing and the like. This is particularly annoying to women. Another disadvantage with conventional hatchback type construction is that during inclement weather, the trunk and its contents are exposed to the elements, such as rain or snow, each time the liftgate is opened. Moreover, the passengers are then exposed to sudden temperature changes, dust and wind each time the lid is opened.

SUMMARY OF THE INVENTION

It is a major object of the present invention to provide a dual deck construction for the trunk of a hatchback type automobile which overcomes the aforementioned disadvantages.

A more particular object of the present invention is to provide a dual deck construction for the trunk of a hatchback type automobile which utilizes a forward deck and a rear deck, with the rear deck being contiguous with the forward deck. The trunk is covered by a two piece liftgate having a front lid portion generally overlying the forward deck and a rear lid portion generally overlying the rear deck. The front and rear lid portions are hinged together at the approximate juncture of the forward and rear decks. The front of the liftgate is hinged to the front edge of the trunk opening in a conventional manner. With this arrangement, the rear deck lid may be opened independently of the front deck lid to afford access solely to the rear deck, and with the front deck lid alternately being openable to afford simultaneous access to both the forward and rear decks.

Another object of the present invention is to provide a dual deck construction of the aforedescribed nature which is simple of design, foolproof in operation and is economical of construction.

Yet another object of the present invention is to provide an automobile construction of the aforedescribed nature which employs first and second lock means, the first lock means permitting solely the rear lid portion to be opened while the front lid portion remains closed, and the second lock means being operable to permit the front lid to move towards its open position with the rear lid locked relative to the front lid.

Yet a further object of the invention is to provide an automobile construction of the aforedescribed nature provided with a unique water drain arrangement.

These and other objects and advantages of the present invention will become apparent from the following detailed description when taken in conjunction with the appended drawings.

BRIEF DESCRIPTION OF THE DRAWINGS

FIG. 6 is a vertically exploded perspective view of said dual deck construction;

FIG. 7 is a vertical sectional view taken in enlarged scale along line 7—7 of FIG. 1 showing a preferred locking mechanism for such construction;

FIGS. 8 and 9 are fragmentary views of the locking mechanism of FIG. 7 showing the operation thereof;

FIG. 10 is a vertical sectional view taken in enlarged scale along line 10—10 of FIG. 1;

FIG. 11 is a vertical sectional view taken in enlarged scale along line 11—11 of FIG. 1;

FIG. 12 is a vertical sectional view taken in enlarged scale along line 12—12 of FIG. 6, but with the rear deck lid arranged in its assembled and closed position;

FIG. 13 is a vertical sectional view taken in enlarged scale along line 13—13 of FIG. 1; and FIG. 14 is a vertical sectional view taken in enlarged scale along line 14—14 of FIG. 1.

DETAILED DESCRIPTION OF A PREFERRED EMBODIMENT

Figure 1:
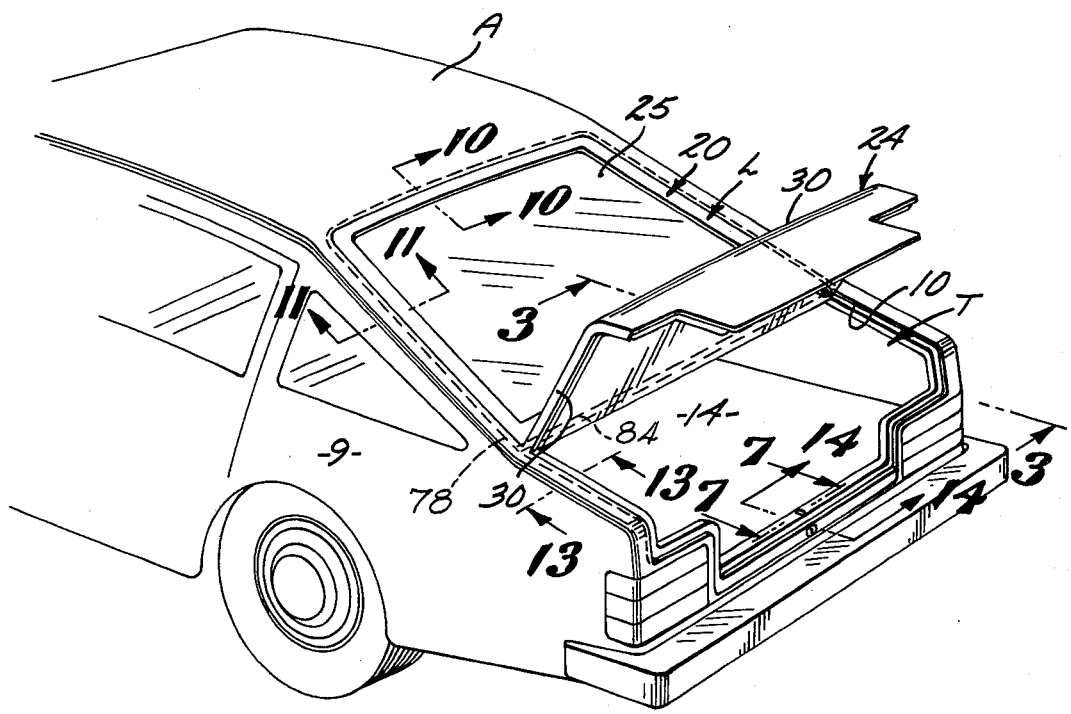
FIG. 1 is a rear perspective view of a hatchback type automobile provided with a preferred form of dual deck construction embodying the present invention, the rear deck lid being shown in an open position.

Referring to the drawings, and particularly FIGS. 1 through 4, a preferred form of dual deck construction for the trunk of a hatchback type automobile is shown in conjunction with such an automobile designated A. The body 9 of automobile A is provided at its rear portion with a large trunk, generally designated T. Such trunk T is defined by an upwardly-facing opening 10 in the rear portion of body 9. The floor of the trunk T is defined by a dual deck D having a forward deck portion 12, the rear edge of which is contiguous with the front edge of a rear deck portion 14. The trunk opening 10 receives a two-piece liftgate, generally designated L.

The two-piece liftgate L includes a front lid 20 which generally overlies at least the major forward deck portion 12, and is hinged along its forward edge in a conventional manner to the rear top portion of automobile A along the front edge of trunk opening 10. The rear edge of front lid 20 is hingedly secured to the front edge of rear deck lid 24 at the approximate juncture of the front and rear decks.

Liftgate L is provided with lock means LM, described fully hereinafter, which permit solely the rear deck lid 14 to be moved to its open position of FIGS. 1 and 3, or alternatively, the entire liftgate L can be moved to its open position of FIG. 2. When the entire liftgate is raised, the lock means LM can be utilized to secure the rear deck lid 24 locked to the front deck lid 20.

More particularly, front lid 20 is provided with a rear window 25. The rear deck lid 24 includes a downwardly sloping portion which, at its rear edge, is bent sharply downwardly at 30 to an approximately vertical inclination. The liftgate L is preferably constructed with a rigid frame, generally designated 40, formed of metal or fiber glass, and formed with mirror image side elements 68 and 69, shown in FIG. 6. The upper portion of frame 40 is formed with an aperture 42 that receives rear window 25. The lower portion of the frame is open to receive the rear deck lid 24. A pair of hinge mounting ears 44 extend rearwardly from an intermediate spacer 46 of frame 40. Each support a pin 49 to pivotally receive the front end of conventional arcuate hinge arms 48. The rear end of such hinge arms 48 are rigidly affixed to the underside of the front portion of rear deck lid 24, as shown particularly in FIG. 3. A torsion bar 51 is fixedly carrier by ears 44, with the offset ends thereof rotatably connected to cranks 52 having their opposite ends pivotally secured to the intermediate portions of hinge arms 48 within the confines of ears 44, as shown in FIG. 3. This conventional arrangement serves to constantly bias rear deck lid 24 towards its raised, open position of FIGS. 1 and 3.

The mid-portion of rear spacer 50 of frame 40 supports the lock means LM referred to above, such lock means being operated by a key 53. As indicated particularly in FIG. 10, the front edge of top spacer 54 of frame 50 is provided with a pair of conventional hinge tongues 56 which are pivotally secured to complementary hinge mounts 58 by pins 60. The hinge mounts 58 are rigidly secured to a transverse web 62 that extends along the rear edge of the roof 64 of the automobile A. It should be understood that this hinge arrangement is conventional. Liftgate L is biased towards its raised, open position by a pair of conventional like, telescoping check arms 65 interposed between the intermediate portion of front deck lid 20 and the body 9 of automobile A within the upper portion of trunk opening 10. Such check arms 65 utilize a fluid valve and spring arrangement which tend to raise liftgate L when it is opened and supports such liftgate in its raised position. The check arms permit the liftgate to be readily manually lowered to its closed position. Suitable check arms of this nature are marketed by Gas Spring Corporation of Montgomery, Pennsylvania.

With continued reference to FIG. 10, a sealing strip 66 is carried by a plate 67 that extends rearwardly of web 62 to sealingly engage the underside of frame spacer 54. The open space between the strip 66 and the rear of web 62 defines an upper drain trough 67a in a conventional manner.

Referring to FIGS. 11 and 13, resilient sealing strip 70 sealingly engages the underside of side element 68 in the region of window 25, and the underside of rear deck lid 24 along the side edges thereof. The lower end of each such sealing strip is supported upon a web 72 formed on the body of automobile A along the edges of trunk opening 10. Outwardly of web 72, there is formed on the body 9 of automobile A sidewardly and upwardly extending channels 74. The space between web 72 and channels 74 defines a downwardly extending drain trough 78 which is a continuation of the upper drain trough 67a. It should be noted that liftgate L is shown in its closed position in FIGS. 10-14.

Referring to FIG. 12, the intermediate spacer 46 of frame 40 is provided at its upper portion with a rear window mount 78 that is engaged with the lower portion of window 25. Rearwardly of such window mount, spacer 50 extends downwardly and rearwardly, terminating in an upwardly directed flange that supports a resilient sealing strip 80. Sealing strip 80 abuts the underside of the rear deck lid 24. The space forwardly of the front edge of rear deck lid 24 and the frame spacer 46 defines a drain channel 84. It should be understood that the side extremities of such drain channel 84 are in communication with the intermediate portions of side drain troughs 78.

Referring to FIG. 14, the body 9 of automobile A is formed at the rear of trunk opening 10 with a channel 90 having a sill 92. Forwardly of sill 92, channel 90 is provided with an upstanding web 94. The upper edge of the latter supports a resilient sealing strip 96 that engages the underside of rear deck lid 24. The space rearwardly of web 94 defines a drain channel 98 having its sides in communication with the lower ends of side drain channels 78 and its rear end open so as to permit water drainage. Rear spacer member 50 of frame 40 is disposed within such space when rear deck lid 24 is in its lowered, closed position shown in FIG. 14.

Locking means LM are particularly shown in FIGS. 7, 8, 9 and 14. Referring thereto, such locking means includes the aforementioned key 53 which is usable with a conventional tumbler lock 102 centrally carried by the lower frame spacer 50. A generally horizontally extending shaft 104 extends forwardly from the tumbler mechanism 102. The front end of such shaft 104 is keyed to a cam 106, whereby rotation of key 53 will effect concurrent rotation of shaft 104 and cam 106. The cam 106 includes an arcuate surface 108, the upper and lower portions of which merge into generally radially extending surfaces 110 and 111. Cam 106 is interposed between upper and lower latch dogs, generally designated 112 and 114 respectively. Cam 106 and the two latch dogs are supported upon a bracket 116 carried by frame element 50, as shown best in FIG. 14. The upper and lower latch dogs are pivotally supported by bracket 116. An upper tension spring 118 extends between upper latch dog 112 and an eye 120 secured to spacer 50 to constantly bias the upper latch dog 112 to rotate in a clockwise direction, as viewed from the rear. A lower tension spring 121 extends between lower latch dog 114 and frame spacer 50 to constantly bias the lower latch dog to rotate in a counter-clockwise direction, as viewed from the rear. Upper latch dog 112 is formed with a notch 122 that engages a depending loop 124 having its upper ends secured to the lower rear edge of the rear deck lid 24.

With key 53 disposed in its normal vertically extending position of FIG. 7, cam 106 maintains the upper latch dog 112 in its locked position shown in this figure. At this time, the loop 122 will be disposed within notch 121. The upper latch dog is normally maintained in such position by the abutment of a nose element 126 formed on the lower portion thereof with the upper surface of arcuate portion 108 of cam 106. When key 53 is rotated clockwise, cam 106 concurrently undergoes clockwise rotation. When nose 126 of the upper latch dog moves off the upper edge of arcuate surface 106, spring 118 will rotate the upper latch dog in a clockwise direction. As indicated in FIG. 8, the notch 122 of the upper latch dog will then clear the loop 124 and the rear deck lid 24 will be free to open upwardly under the influence of torsion bar 51 to its position of FIGS. 2 and 3. Torsion bar 51 then resiliently retains the rear deck lid 24 in its raised, open position.

Lower latch dog 114 is formed with a notch 129 that engages an upstanding loop 130 secured to the sill 92. With the loop 130 disposed within notch 129, the frame 40 of lift gate L will be retained in its lowermost position. It will, therefore, be understood that when key 53 is operated to permit rear deck lid 24 to be opened, the front deck lid 20 will remain in its closed position of FIGS. 1 and 3. When it is desired to raise the entire lift gate L to its open position, rear deck lid 24 is preferably lowered to its lower position. Such lowering of the rear deck lid will cause the lower edge of loop 124 to engage the left portion of the upper latch dog and cam such latch dog in a counter-clockwise position so as to again dispose the mounting loop within the confines of notch 122 of the upper latch dog. In this manner, the rear deck lid will be again locked in its lower, closed position as shown in FIG. 9. Key 53 is then rotated in a counter-clockwise direction so as to cause the nose 132 of lower latch dog 114 to move off arcuate surface 108 of cam 106. Lower tension spring 121 will then snap the lower latch dog in a counter-clockwise direction whereby the lower loop 130 is withdrawn from notch 129 of the lower latch dog, as indicated in FIG. 9. The lift gate L will then be free to be moved into its raised, open position of FIG. 2. The aforementioned check arms 65 then resiliently support liftgate L in its raised, open position. It should be understood that other types of locking means may be employed with the dual deck construction of the present invention.

Figure 3:
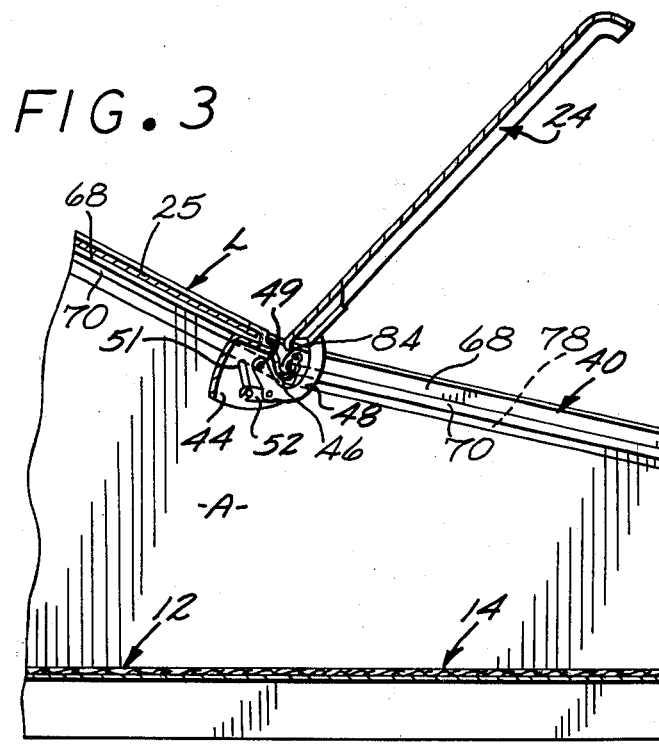
FIG. 3 is a vertical sectional view taken along line 3—3 of FIG. 1.

In utilizing the above described construction and referring first to FIGS. 1 and 3, assuming a small load is to be carried within trunk T, solely the rear deck lid 24 would be raised. It should be particularly noted that it is not necessary to raise the entire liftgate L each time access to the trunk is desired, thereby exposing the trunk contents and the passengers to the elements. Instead, solely the rear lid 24 may be raised independently of the frame 50 and front deck 20 to provide access to the rear deck 14.

Figure 2:
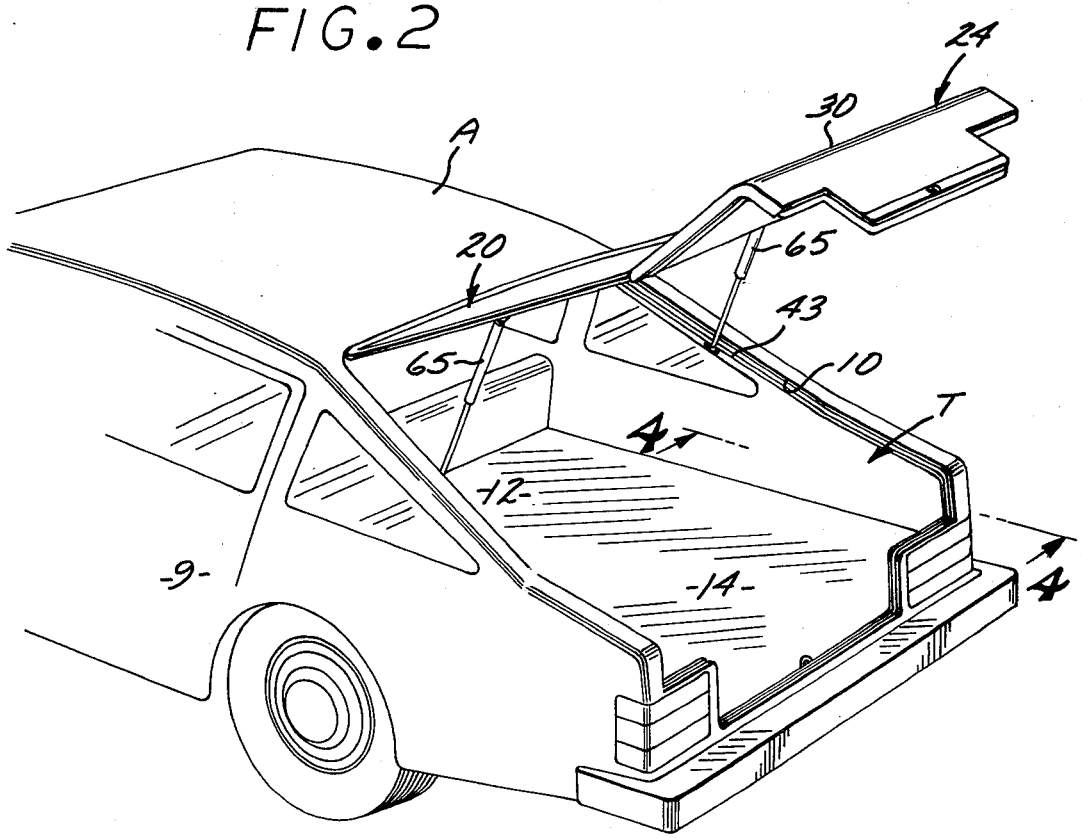
FIG. 2 is a perspective view similar to FIG. 1 but showing the entire liftgate in a raised position.
Figure 4:
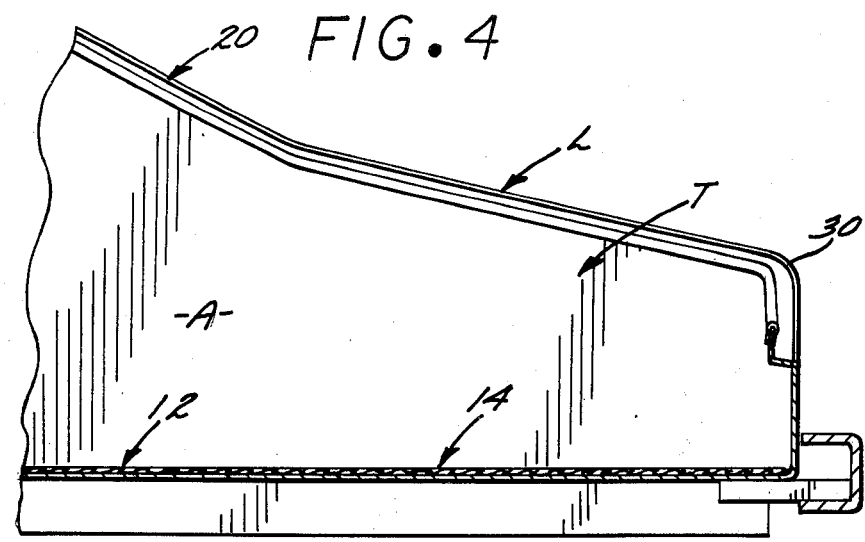
FIG. 4 is a vertical sectional view taken along line 4—4 of FIG. 2.

Referring now to FIG. 2, should it become necessary to utilize the entire trunk space, the rear deck lid 24 is preferably lowered and locked in its closed position of FIG. 2. Next, the entire liftgate L is raised. Both the forward and rear decks 12 and 14 are then available to receive a load. It should be noted that where oversized loads are to be carried, such loads may be disposed upon the front and rear decks and the liftgate L lowered until the front deck lid 20 is arranged in its normal closed position. Thereafter, rear deck lid 24 may be lowered to rest upon such load. This arrangement eliminates the necessity of leaving the entire liftgate L open, as with a conventional hatchback, so as to restrain noise, internal winds and gas fumes from entering the interior of the automobile.

Figure 5:
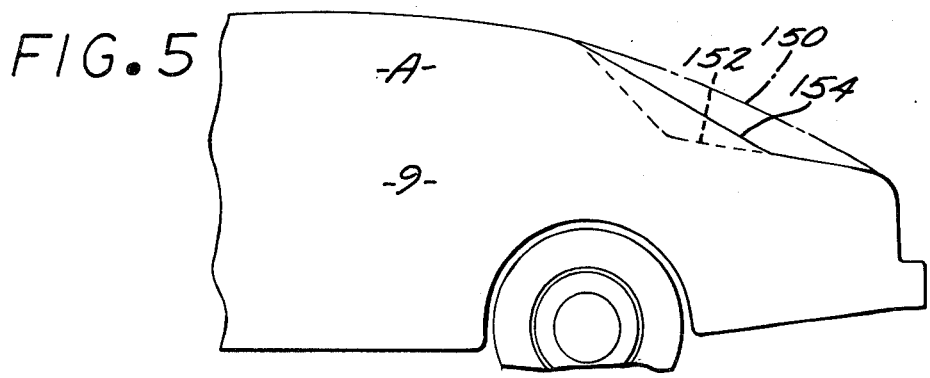
FIG. 5 is a broken side elevational view of the hatchback type automobile shown in FIGS. 1-4.

Referring now to FIG. 5, it should be particularly noted that the dual deck construction of the present invention permits the utilization of a unique rear profile for an automobile. Thus, the outline of a conventional hatchback rear side profile is indicated at 150. The side profile of a conventional trunk arrangement is indicated in dotted outline at 152. Such conventional deck construction requires a certain deck length thereby necessitating a trunk length shorter than that of a hatchback type vehicle. Referring now to line 154, there is shown the side profile of an automobile employing the dual deck construction of the present invention. The comparatively shorter horizontal slope of the trunk portion compared to the horizontal portion of a conventional trunk portion will be apparent. Accordingly, the dual deck construction of the present invention will be seen to afford designers a new latitude with respect to the aesthetic appearance of an automobile.

Various modifications and changes may be made with respect to the foregoing detailed description without departing from the spirit of the present invention.

We claim:

1. A dual deck construction for a hatchback type automobile, the body of such automobile having a trunk, said construction including:
   an upwardly-facing trunk opening in the body of said automobile;
   a forward deck defining the front portion of the floor of said trunk;
   a rear deck defining the rear portion of said trunk floor extending rearwardly from the rear of said forward deck and contiguous therewith;
   a liftgate for covering said opening and having a front deck lid overlying at least the major portion of said forward deck, and a rear deck lid overlying said rear deck, said rear deck lid being hinged to said liftgate at the approximate juncture of said forward and rear decks;
   hinge means connecting the front of said liftgate to the rear top portion of said automobile body along the front of said trunk opening; and
   with the rear lid being openable independently of said front lid to afford access to said rear deck, and the entire liftgate being openable to afford simultaneous access to both the forward and rear decks.

2. A dual deck construction as set forth in claim 1 wherein said liftgate and said rear deck lid are resiliently supported in their raised, open positions.

3. A dual deck construction for a hatchback type automobile, the body of such automobile having a trunk, said construction including:
   an upwardly-facing trunk opening in the body of said automobile;
   a forward deck defining the front portion of the floor of said trunk;
   a rear deck defining the rear portion of said trunk floor extending rearwardly from the rear of said forward deck and contiguous therewith;
   a liftgate for covering said opening and having a front lid overlying at least the major portion of said forward deck, and a rear deck lid overlying said rear deck, the front of said rear deck lid being hinged to said liftgate at the approximate juncture of said forward and rear decks;
   hinge means connecting the front of said liftgate to the rear top portion of said automobile body along the front of said trunk opening;
   with the rear lid being openable independently of said front lid to afford access to said rear deck, and the entire liftgate being openable to afford simultaneous access to both the forward and rear decks;
   first lock means to releasably secure said rear deck lid in its closed position; and
   second lock means that restrain said front deck lid from opening when said rear deck lid is opened.

4. A dual deck construction as set forth in claim 3 wherein said liftgate and said rear deck lid are resiliently supported in their raised, open positions.

5. A dual deck construction for a hatchback type automobile, the body of such automobile having a trunk, said construction including:
   an upwardly-facing trunk opening in the body of said automobile;
   a forward deck defining the front portion of the floor of said trunk;

a rear deck defining the rear portion of said trunk floor extending rearwardly from the rear of said forward deck and contiguous therewith;

a liftgate for covering said opening and having a frame that supports a front lid overlying at least the major portion of said forward deck;

a rear deck lid overlying said rear deck and having its front end hinged to the intermediate portion of said frame at the approximate juncture of said forward and rear decks;

hinge means connecting the front of said liftgate frame to the rear top portion of said automobile body along the front of said trunk opening;

the rear lid being openable with said liftgate disposed in its lowered, closed position to afford access to said rear deck; and with the entire liftgate being openable to afford simultaneous access to both the forward and rear decks.

6. A dual deck construction as set forth in claim 5 which further includes:

first lock means interposed between said frame and said rear deck to releasably secure said rear deck lid in its closed position; and second lock means interposed between said body and said liftgate that restrain said liftgate from opening when said rear deck lid is opened.

7. A dual deck construction as set forth in claim 5 wherein said liftgate and said rear deck lid are resiliently supported in their raised, open positions.

8. A dual deck construction as set forth in claim 6 wherein said liftgate and said rear deck lid are resiliently supported in their raised, open positions.

9. A dual deck construction for a hatchback type automobile, the body of such automobile having a trunk, said construction including:

an upwardly facing trunk opening in the body of said automobile;

a forward deck defining the front portion of the floor of said trunk;

a rear deck defining the rear portion of said trunk floor extending rearwardly from the rear of said forward deck and contiguous therewith;

a liftgate for covering said opening and having a frame that includes interconnected side elements and top, intermediate and rear spacers;

a window positioned between the top and intermediate spacers of said frame, the space between said top and intermediate spacers defining a front deck lid overlying at least the major portion of said forward deck;

a rear deck lid overlying said rear deck, the front of said rear deck lid being hinged to said intermediate spacer at the approximate juncture of said forward and rear decks;

hinge means connecting the front of said liftgate frame to the rear top portion of said automobile body along the front of said trunk opening;

with the rear lid being openable independently of said liftgate to afford access to said rear deck; and the entire liftgate being openable to afford simultaneous access to both the forward and rear decks.

10. A dual deck construction as set forth in claim 9 which further includes:

first lock means interposed between said rear spacer and said rear deck lid to releasably secure said rear deck lid in its closed position; and second lock means interposed between said rear spacer and said body that restrain said liftgate from opening when said rear deck lid is opened.

11. A dual deck construction as set forth in claim 9 wherein said liftgate and said rear deck lid are resiliently supported in their raised, open positions.

12. A dual deck construction as set forth in claim 9 wherein interconnecting drain troughs are provided between the portion of said automobile body adjacent said trunk opening and the top, sides and bottom of said liftgate, with a drain through being formed between the front of said rear deck lid and said intermediate spacer, the sides of the latter drain trough being in communication with said side drain troughs.

13. A dual deck construction as set forth in claim 10 wherein said liftgate and said rear deck lid are resiliently supported in their raised, open positions.

14. A dual deck construction as set forth in claim 10 wherein interconnecting drain troughs are provided between the portion of said automobile body adjacent said trunk opening and the top, sides and bottom of said liftgate, with a drain trough being formed between the front of said rear deck lid and said intermediate spacer, the sides of the latter drain trough being in communication with said side drain troughs.

15. A dual deck construction as set forth in claim 11 wherein interconnecting drain troughs are provided between the portion of said automobile body adjacent said trunk opening and the top, sides and bottom of said liftgate, with a drain trough being formed between the front of said rear deck lid and said intermediate spacer, the sides of the latter drain trough being in communication with said side drain troughs.

* * * * *